US011035945B2

(12) United States Patent
Philipp et al.

(10) Patent No.: US 11,035,945 B2
(45) Date of Patent: Jun. 15, 2021

(54) SYSTEM AND METHOD OF CONTROLLING OPERATION OF A DEVICE WITH A STEERABLE OPTICAL SENSOR AND A STEERABLE RADAR UNIT

(71) Applicant: GM Global Technology Operations LLC, Detroit, MI (US)

(72) Inventors: Tzvi Philipp, Bet Shemesh (IL); Shahar Villeval, Tel Aviv (IL); Igal Bilik, Rehovot (IL); Jeremy A. Salinger, Southfield, MI (US); Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 286 days.

(21) Appl. No.: 16/387,998

(22) Filed: Apr. 18, 2019

(65) Prior Publication Data

US 2020/0333454 A1 Oct. 22, 2020

(51) Int. Cl.
| | |
|---|---|
| *G01S 13/58* | (2006.01) |
| *G05D 1/02* | (2020.01) |
| *G01S 13/86* | (2006.01) |
| *G01S 13/931* | (2020.01) |
| *G01S 13/02* | (2006.01) |
| *G01S 13/44* | (2006.01) |
| *G01S 13/00* | (2006.01) |

(52) U.S. Cl.
CPC .......... *G01S 13/587* (2013.01); *G01S 13/867* (2013.01); *G01S 13/931* (2013.01); *G05D 1/0246* (2013.01); *G05D 1/0257* (2013.01)

(58) Field of Classification Search
CPC .............................. G01S 13/865; G01S 13/878
See application file for complete search history.

(56) References Cited

U.S. PATENT DOCUMENTS

| | | | | |
|---|---|---|---|---|
| 5,471,214 A * | 11/1995 | Faibish | ................ | G01S 13/931 342/70 |
| 6,941,211 B1 * | 9/2005 | Kuroda | ................ | G01S 13/867 701/70 |
| 9,046,599 B2 * | 6/2015 | Morikawa | ............. | G01S 17/931 |
| 10,145,951 B2 * | 12/2018 | Izzat | ..................... | G01S 13/867 |
| 10,353,066 B2 * | 7/2019 | Schwager | ............. | G01S 13/867 |
| 10,864,860 B2 * | 12/2020 | Li | ......................... | G01S 13/878 |
| 2004/0012516 A1 * | 1/2004 | Schiffmann | ........... | G01S 13/878 342/70 |
| 2005/0197770 A1 * | 9/2005 | Schiffmann | ........... | G01S 13/931 701/301 |

(Continued)

*Primary Examiner* — Bernarr E Gregory
(74) *Attorney, Agent, or Firm* — Quinn IP Law (57) ABSTRACT

System and method of controlling operation of a device in real-time. The system includes an optical sensor having a steerable optical field of view for obtaining image data and a radar unit having a steerable radar field of view for obtaining radar data. A controller may be configured to steer a first one of the optical sensor and the radar unit to a first region of interest and a second one of the optical sensor and the radar unit to the second region of interest. The controller may be configured to steer both the optical sensor and the radar unit to the first region of interest. The radar data and the image data are fused to obtain a target location and a target velocity. The controller is configured to control operation of the device based in part on at least one of the target location and the target velocity.

19 Claims, 3 Drawing Sheets

(56) References Cited

U.S. PATENT DOCUMENTS

| | | | |
|---|---|---|---|
| 2006/0125680 A1* | 6/2006 | Thackray | G01S 13/865 |
| | | | 342/54 |
| 2016/0162743 A1* | 6/2016 | Chundrlik, Jr. | G01S 13/931 |
| | | | 348/148 |
| 2017/0262716 A1* | 9/2017 | Matsumoto | G01S 13/867 |
| 2020/0309942 A1* | 10/2020 | Kunz | G01S 13/931 |

* cited by examiner

SYSTEM AND METHOD OF CONTROLLING OPERATION OF A DEVICE WITH A STEERABLE OPTICAL SENSOR AND A STEERABLE RADAR UNIT

INTRODUCTION

The present disclosure relates to a system and method of controlling operation of a device in real-time with a steerable optical sensor and a steerable radar unit. Mobile platforms, such as motor vehicles, encounter other moving and non-moving objects as they journey through space and time. Many mobile platforms include various types of imaging sensors to track these moving and non-moving objects. While it is advantageous to image over a wide field of view, it generally entails sacrificing resolution for the size of the field of view. In other words, a trade-off exists between the size of the field of view and angular resolution.

SUMMARY

Disclosed herein is a system and method of controlling operation of a device in real-time. The system includes an optical sensor and a radar unit operatively connected to the device and configured to obtain an image data and a radar data, respectively. The optical sensor has a steerable optical field of view controllable to scan respective portions of a full optical field of view. The radar unit has a steerable radar field of view controllable to scan the respective portions of a full radar field of view. The full radar field of view at least partially overlaps with the full optical field of view. The system employs the steerable optical sensor and the steerable radar unit to achieve a relatively high angular resolution at a wide field of view.

A controller is in communication with the radar unit and the optical sensor, the controller including a processor and tangible, non-transitory memory on which instructions are recorded for a method of detecting a target. Execution of the instructions by the processor causes the controller to steer a first one of the optical sensor and the radar unit to a first region of interest. The first one of the optical sensor and the radar unit is configured to detect the target in the first region of interest and identify a second region of interest surrounding the target, the second region of interest at least partially overlapping with the first region of interest.

The controller is configured to steer a second one of the optical sensor and the radar unit to the second region of interest. The radar data from the second region of interest and the image data from the second region of interest are fused. A target location and a target velocity are obtained from the fused data. The controller is configured to control operation of the device based in part on at least one of the target location and the target velocity. The controller may be configured to steer the first one of the optical sensor and the radar unit in response to receiving a trigger signal. For example, the trigger signal may be generated upon receipt of a signal by the controller from a remote server of an erratic vehicle in a surrounding area. The trigger signal may be automatically generated at predefined time interval, e.g., ten times every second. The trigger signal may be generated each time the device makes a specific maneuver, e.g. making a turn.

The radar sensor may include a transmitter producing electromagnetic waves in at least one of a radio and a microwave domain and one or more transmitting antennas configured to transmit electromagnetic waves. Respective phase shifters may be operatively connected to the transmitting antennas and configured to shift a phase of the electromagnetic waves to produce a phased-array beam. The radar sensor may include one or more receiver antennas configured to receive the electromagnetic waves and direct them to a receiver module, via respective beam modifiers. The controller may include at least one of a Kalman filter module or a particle filter module for performing the fusion of the image data and the radar data. Fusing the image data and the radar data may include obtaining at least one bounding region around the target in the image data and matching the at least one bounding region in the image data with the target location in radar data, via an association module in the controller.

Controlling operation of the device may include obtaining a time-to-contact for the device and the target based at least partially on the target location denoted by (X, Y, Z) and the target velocity denoted by $(v_x, v_y, v_z)$. The time-to-contact (t) may be determined as:

$$t=\sqrt{(X/v_x)^2+(Y/v_y)^2+(Z/v_z)^2}.$$

A signal may be sent to a user of the device when a time-to-contact is less than a first predefined threshold but greater than a second predefined threshold, the first predefined threshold being greater than the second predefined threshold. The device may include an automatic braking module configured to decelerate the device. Controlling operation of the device may include activating the automatic braking module when the time-to-contact is less than the second predefined threshold.

The controller may include an automated device control unit, a radar processing unit and an image processing unit. The radar processing unit and the image processing unit may be configured to produce a respective processed output from the radar data and the image data. In one example, the respective processed output from the first one of the optical sensor and the radar unit is transmitted to the second one of the optical sensor and the radar unit. The respective processed output from the second one of the optical sensor and the radar unit is then fused with the respective processed output from the first one of the optical sensor and the radar unit, and subsequently transmitted to the automated device control unit. In another example, the respective processed output from the radar processing unit and the image processing unit are transmitted independently to the automated device control unit.

The above features and advantages and other features and advantages of the present disclosure are readily apparent from the following detailed description of the best modes for carrying out the disclosure when taken in connection with the accompanying drawings.

DETAILED DESCRIPTION

Figure 1:
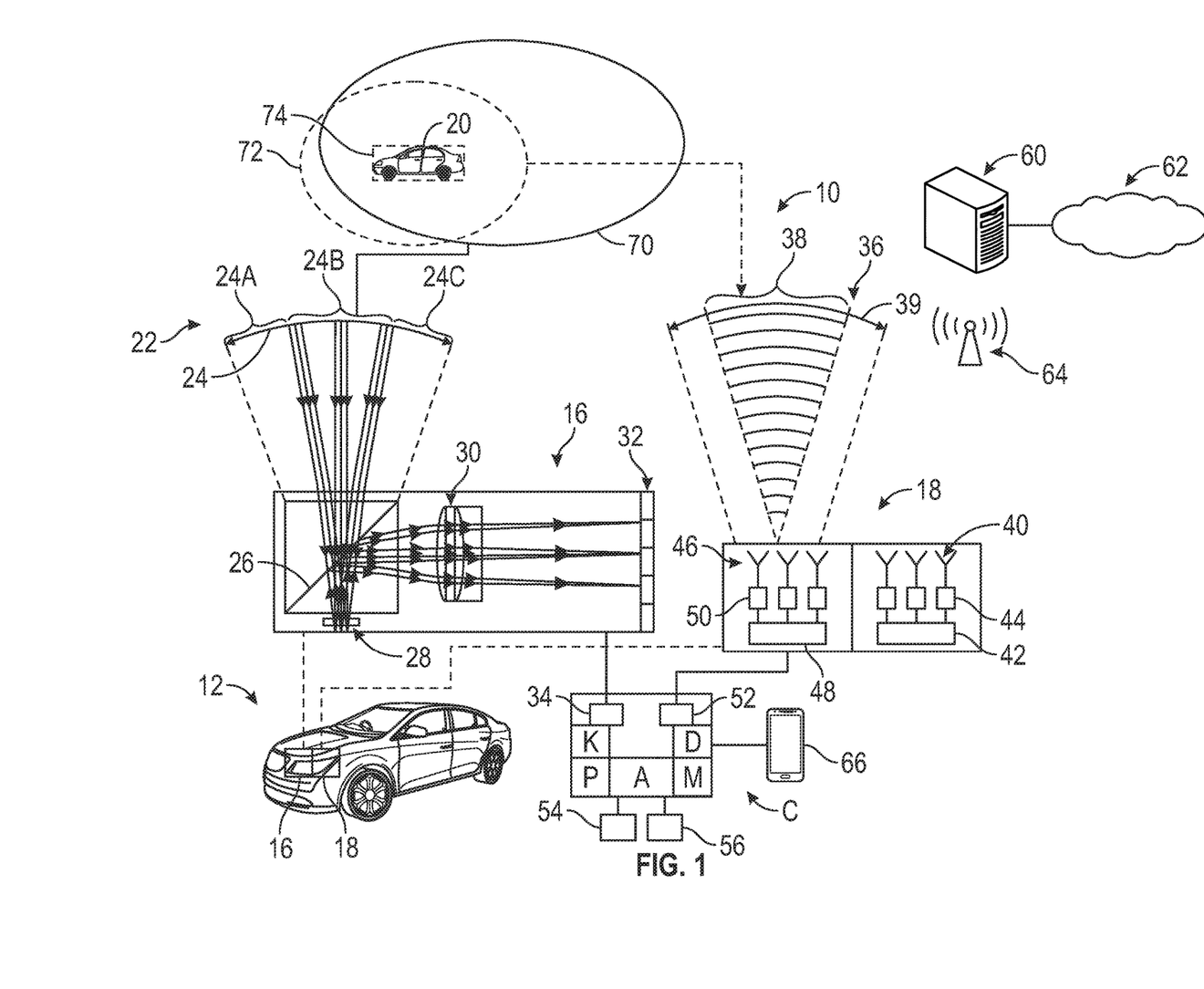
FIG. 1 is a schematic perspective view of an example device having a controller, a radar unit and an optical sensor.

Referring to the drawings, wherein like reference numbers refer to like components, FIG. 1 schematically illustrates a system 10 of controlling operation of a device 12 in real-time. The device 12 may be a mobile platform such as, but not limited to, a passenger car, sport utility car, light truck, heavy duty truck, all-terrain vehicle, minivan, bus, transit vehicle, bicycle, robot, farm implement (e.g. tractor), sports-related equipment (e.g. golf cart), boat, airplane and train. The device 12 may take many different forms and include multiple and/or alternate components and facilities.

Referring to FIG. 1, the optical sensor 16 and the radar unit 18 are operatively connected to the device 12 and configured to obtain image data and radar data, respectively. It is to be appreciated that the location of the optical sensor 16 and the radar unit 18 relative to the device 12, such as front, rear or side, may be varied according to the application at hand. Referring to FIG. 1, a controller C is operatively connected to the device 12 and includes at least one processor P and at least one memory M (or non-transitory, tangible computer readable storage medium) on which are recorded instructions for executing method 100 and/or method 200 (described in detail in FIGS. 2 and 3, respectively) for detecting a target 20. The memory M can store controller-executable instruction sets, and the processor P can execute the controller-executable instruction sets stored in the memory M.

Referring to FIG. 1, the optical sensor 16 has a steerable optical field of view 22 controllable to scan a respective portion (such as portions 24A, 24B, 24C) of a full optical field of view 24. The image data may include a sequence of visual images of the target 20 at various times. The image data may include a single visual image of the target 20. Referring to FIG. 1, the optical sensor 16 may include a beam splitter 26, a mirror 28, at least one lens 30 for focusing the incoming beam and a plurality of detectors 32. The beam splitter 26 may be silver or dielectric coated glass plate and may be a polarizing beam splitter. The plurality of detectors 32 may be configured to provide an electrical signal based on respective irradiances on their respective active surfaces. The optical sensor 16 may include other components (not shown) available to those skilled in the art, such as for example, a photomultiplier, dispersion devices, apertures, and modulators. Referring to FIG. 1, the steerable optical field of view 22 (e.g. scanning pattern or dwell time spent on the portions 24A, 24B, 24C) may be controlled through an optical control unit 34.

Referring to FIG. 1, the radar unit 18 has a steerable radar field of view 36 controllable to scan a respective portion 38 of a full radar field of view 39. The optical sensor 16 and the radar unit 18 are mounted or positioned such that the full radar field of view 39 at least partially overlaps with the full optical field of view 24. The full radar field of view 39 may substantially overlap with the full optical field of view 24. The radar unit 18 may include a transmitter module 42 directing electromagnetic waves in at least one of a radio and a microwave domain and one or more transmitting antennas 40 configured to transmit the electromagnetic waves. Respective phase shifters 44 may be operatively connected to the transmitting antennas 40 and configured to shift a phase of the electromagnetic waves to produce a phased-array beam. The electromagnetic waves reflect off the target 20 and return to the radar unit 18, providing information about the location and speed of the target 20. The radar data may include a radial distance (r) of the target 20 from the device 12, an azimuth angle (not shown), an elevation angle (not shown), and a range rate (dr/dt).

Referring to FIG. 1, the radar unit 18 may include one or more receiver antennas 46 configured to receive the reflected electromagnetic waves and direct them to a receiver module 48, via respective beam modifiers 50. The radar unit 18 may employ beamforming at both the transmitting and receiving ends in order to achieve spatial selectivity. For example, a pattern of constructive and destructive interference in the wavefront may be created, by controlling the phase and relative amplitude of the signal at the transmitting antennas 40. Referring to FIG. 1, the steerable radar field of view 36 (e.g. scanning pattern or dwell time spent on the respective portion 38) may be controlled through a radar control unit 52. Other types of radar systems or implementations available to those skilled in the art may be employed.

Referring to FIG. 1, the device 12 may include an automatic braking module 54 otherwise configured to reduce motion or decelerate the device 12 and a lane change assist module 56 configured to assist the device 12 in changing lanes. The automatic braking module 54 and the lane change assist module 56 may be embedded in the controller C or in communication with the controller C without being embedded in the controller C. The communication and control between the various components shown in FIG. 1 may be done with cabling or wirelessly.

Referring to FIG. 1, the controller C may be configured to communicate with a remote server 60 and/or a cloud unit 62, via a wireless network 64. The remote server 60 may be a public or commercial source of information available to those skilled in the art. The device 12 may be configured to receive and transmit wireless communication to the remote server 60 through a mobile application 66, shown in FIG. 1. The mobile application 66 may be built into and run on an infotainment system of the device 12. The circuitry and components of a remote server 60 and mobile application 66 ("apps") available to those skilled in the art may be employed. The mobile application 66 may be integral with, connected (e.g. wired) or otherwise in communication with the controller C, such that it has access to the data in the controller C.

Figure 2:
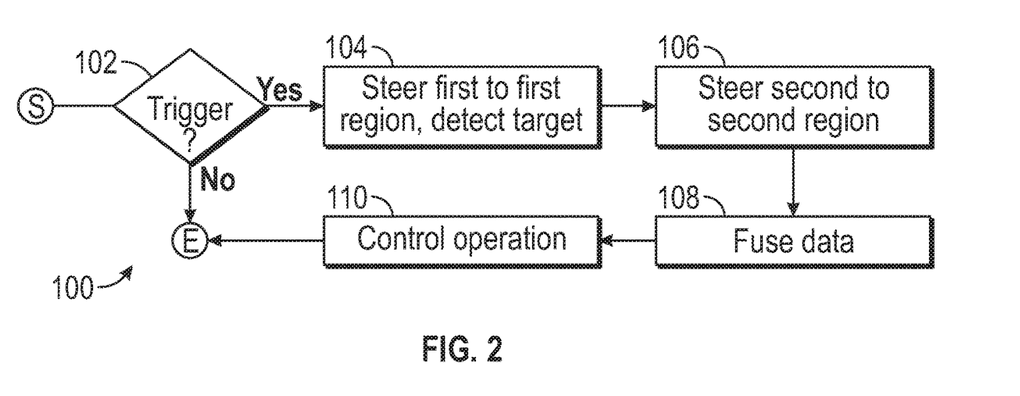
FIG. 2 is a schematic flow diagram for a first method executable by the controller of FIG. 1.

Referring now to FIG. 2, a flowchart of the method 100 stored on and executable by the controller C of FIG. 1 is shown. Method 100 need not be applied in the specific order recited herein. Furthermore, it is to be understood that some steps may be eliminated. The start and end of the method 100 are indicated by "S" and "E," respectively. Per block 102, the controller C is programmed to determine if a trigger signal has been received. If so, the method 100 proceeds to block 104. If not, the method 100 is ended.

Per block 104, the controller C is programmed to steer a first one of the optical sensor 16 and the radar unit 18 to a first region of interest 70 (see FIG. 1). The first region of interest 70 is accessible to the optical sensor 16 and the radar unit 18, in other words, the first region of interest 70 is within the full optical field of view 24 and the full radar field of view 39. In one example, the trigger signal may be generated when the controller C receives a signal from the remote server 60 of an erratic vehicle (e.g. having excessive speed or wrong direction) in a surrounding area of the device 12. The first one of the optical sensor 16 and the radar unit 18 is configured to detect (or localize) the target 20 in the first region of interest 70 and identify a second region of interest 72 surrounding the target 20. In another example, the trigger signal may be automatically generated at predefined time interval, e.g., ten times every second. In another example, the trigger signal may be generated each time the device 14 makes a specific maneuver, e.g. make a turn.

The shape and size of the first region of interest 70 and second region of interest 72 may be selected based on the application at hand. It is to be understood that the first region of interest 70 and the second region of interest 72 shown in FIG. 1 are not drawn to scale. For example, the second region of interest 72 may be defined as a circle or ellipse centered on the estimated location of the target 20 with a predefined radius. The second region of interest may be a rectangular region encapsulating the estimated location of the target 20 and having a predefined height and width. The second region of interest 72 at least partially overlaps with the first region of interest 70. The method 100 proceeds to block 106, where the controller C is configured to steer a second one (i.e. the other one) of the optical sensor 16 and the radar unit 18 to the second region of interest 72.

Per block 108, the radar data and the image data are fused. A target location and a target velocity are obtained from the fused data. Combining the radar data and the image data enhances resolution and increases robustness of the information obtained. The controller C may include a combination module ("K" in FIG. 1) available to those skilled in the art to fuse the image data and the radar data. In one example, the combination module K is a Kalman filter module which works in a recursive fashion and runs in real time, using the current state, the previously calculated state and its uncertainty matrix. The Kalman filter module may work in a two-step process. For example, in a first step, the Kalman filter module produces estimates of the current state variables, along with their uncertainties. Once the outcome of the next measurement (having a discrete amount of error such as random noise) is observed, these estimates are updated using a weighted average, with more weight being given to estimates with higher certainty. In another example, the combination module K is a particle filter module. The particle filter module may be configured to represent samples from a distribution by a set of particles, with each particle having a likelihood weight assigned to it that represents the probability of that particle being sampled from the probability density function. Other methods of combining data available to those skilled in the art may be employed.

Referring to FIG. 1, fusing the image data and the radar data may include obtaining at least one bounding region 74 around the target 20 in the image data and matching the bounding region 74 with the target location in the radar data. The bounding region 74 may be a rectangle, square or other shape. Each bounding region 74 may be defined as the minimum or smallest bounding or enclosing region for a set of points (defining the target 20) in three dimensions. For example, the bounding region may be a rectangle with the smallest volume within which each of the points defining the target 20 lie. Referring to FIG. 1, the controller C may include a deep learning module ("D" in FIG. 1) available to those skilled in the art to detect and localize each bounding region. The controller C may include an association module ("A" in FIG. 1) configured to match the respective bounding regions in the image data with the radar data having a radial distance (r) of the target 20 from the device 12, the azimuth angle and a range rate (dr/dt). The controller C may include a graphics processing unit (not shown) available to those skilled in the art to perform this task in real time.

The selection of the first one and the second one may be made based on the application at hand. If the first one is selected to be the radar unit 18, the radar unit 18 is first employed to provide accurate measurement of range, velocity and a coarse estimation of the azimuth angle to the target 20. The optical sensor 16 is then steered to the second region of interest 72 (surrounding the target location and identified by the radar unit 18) to accurately measure the azimuth angle to the target 20. The fused target information from the radar unit 18 and the optical sensor 16 may then be used to bound the position of and/or classify the target 20.

If the first one is selected to be the optical sensor 16, the optical sensor 16 first scans for the target 20 and the radar unit 18 is then steered to the second region of interest 72 (surrounding the target location and identified by the optical sensor 16) to accurately measure speed and range. The fused target information from the radar unit 18 and the optical sensor 16 may then be used to bound the position of and/or classify the target 20.

Referring to FIG. 2, the method 100 proceeds to block 110 from block 108. Per block 110, the controller C is configured to control operation of the device based in part on at least one of the target location and the target velocity. Controlling operation of the device 12 may include obtaining a time-to-contact for the device 12 and the target 20 based on the target location denoted by (X, Y, Z) and the target velocity denoted by ($v_x$, $v_y$, $v_z$). The time-to-contact (denoted by t) may be determined as:

$$t=\sqrt{(X/v_x)^2+(Y/v_y)^2+(Z/v_z)^2}.$$

A signal may be sent to a user of the device 12 when a time-to-contact is less than a first predefined threshold but greater than a second predefined threshold, the first predefined threshold being greater than the second predefined threshold. When the time-to-contact is less than the second predefined threshold, the controller C may be configured to activate the automatic braking module 54 or the lane change assist module 56. The target location and the target velocity are specified in three dimensions, improving accuracy of the time-to-contact between the device 12 and the target 20.

Figure 3:
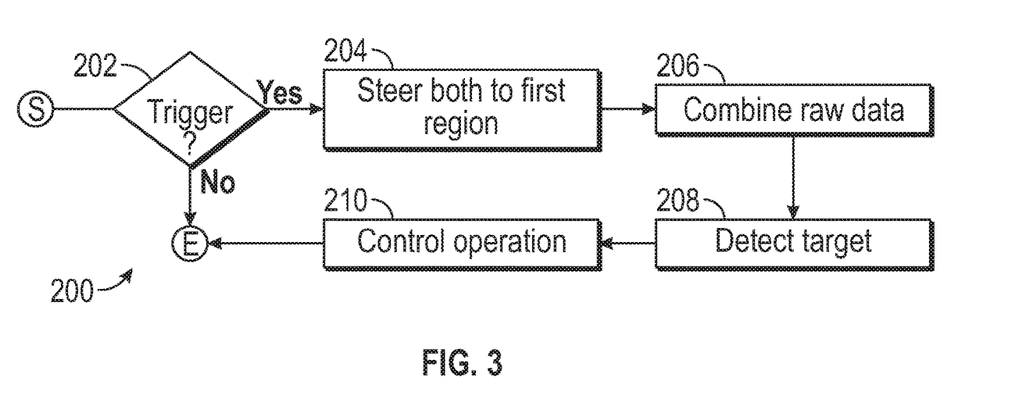
FIG. 3 is a schematic flow diagram for a second method executable by the controller of FIG. 1.

Referring now to FIG. 3, a flowchart of the method 200 stored on and executable by the controller C of FIG. 1 is shown. Method 200 need not be applied in the specific order recited herein. Furthermore, it is to be understood that some steps may be eliminated. The start and end of the method 100 are indicated by "S" and "E," respectively. Per block 202, the controller C is programmed to determine if a trigger signal has been received. If so, the method 200 proceeds to block 204. If not, the method 200 is ended. For example, the trigger signal may be generated when the controller C receives a message from the cloud unit 62 of an erratic vehicle in a surrounding area of the device 12.

Per block 204, the controller C is programmed to steer both the optical sensor 16 and the radar unit 18 to a region of interest (single), such as the first region of interest 70. The method 200 proceeds to block 206. Per block 206, the controller C is configured to combine the radar data and the image data from the first region of interest 70 to obtain a joined data. The methods described above with respect to FIG. 2 may be employed (using the Kalman Filter K, Association Module A and Deep Learning Module D of FIG. 1). Other methods of combining data available to those skilled in the art may be employed. The method 200 proceeds to block 208. Per block 208, the joined data is used to detect the target 20 and to obtain the target location and the target velocity. Similar to method 100 and as described above with respect to FIG. 2, the controller C is programmed to control operation of the device 12 in block 210, based in part on at least one of the target location (x, y, z) and the target velocity ($v_x$, $v_y$, $v_z$), for example by obtaining a time-to-contact for the device 12 and the target 20.

Figure 4:
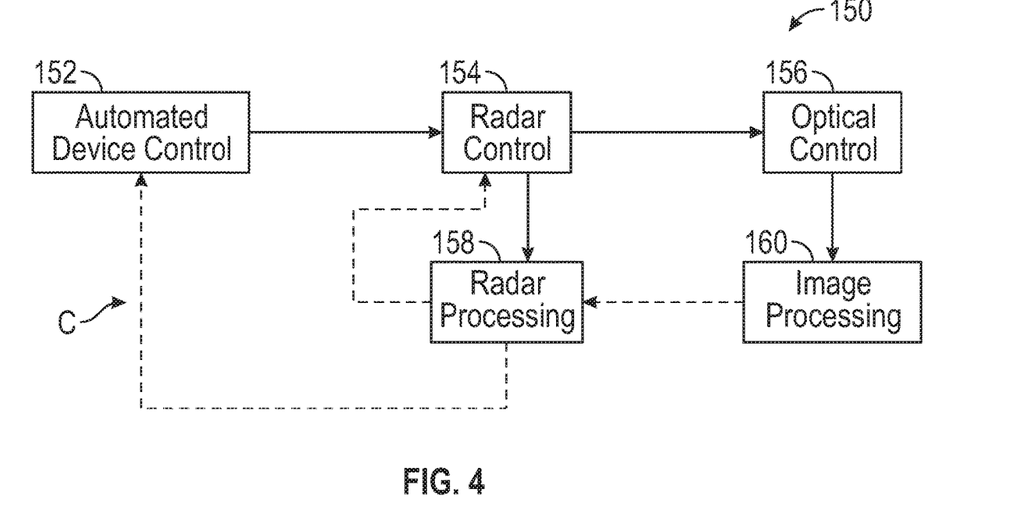
FIG. 4 is an example control structure for implementing the first method shown in FIG. 2.

Referring now to FIG. 4, an example of a control structure 150 for implementing the method 100 of FIG. 2 is shown. The control structure 150 includes an automated device control unit 152, a radar control unit 154, an optical control unit 156, a radar processing unit 158 and an image processing unit 160. In the control structure 150, the first one of the radar unit 18 and the optical sensor 16 is the radar unit 18 and the second one the optical sensor 16. The solid arrows indicate the direction of control and/or data flow, while the dashed arrows show the direction of data flow. As indicated by the solid arrows, the automated device control unit 152 directs the radar control unit 154, which in turn directs the optical control unit 156.

Referring to FIG. 4, the radar control unit 154 and the optical control unit 156 respectively transmit the raw data to the radar processing unit 158 and the image processing unit 160, which generate a respective processed output. Here, the processed output from the first one of the optical sensor 16 and the radar unit 18 is transmitted to the second one of the optical sensor 16 and the radar unit 18. As shown by the dashed arrows in FIG. 4, the image processing unit 160 transfers the respective processed output to the radar processing unit 158. The respective processed output from the image processing unit 160 ("the second one" in this example) is fused with the respective processed output from the radar processing unit 158 and subsequently transmitted to the automated device control unit 152. As shown in FIG. 4, the respective processed output from the radar processing unit 158 may be transmitted to the radar control unit 154 for further optimization. The technical advantage here is that steering of the radar unit 18 and the optical sensor 16 is available within a single processing cycle.

Figure 5:
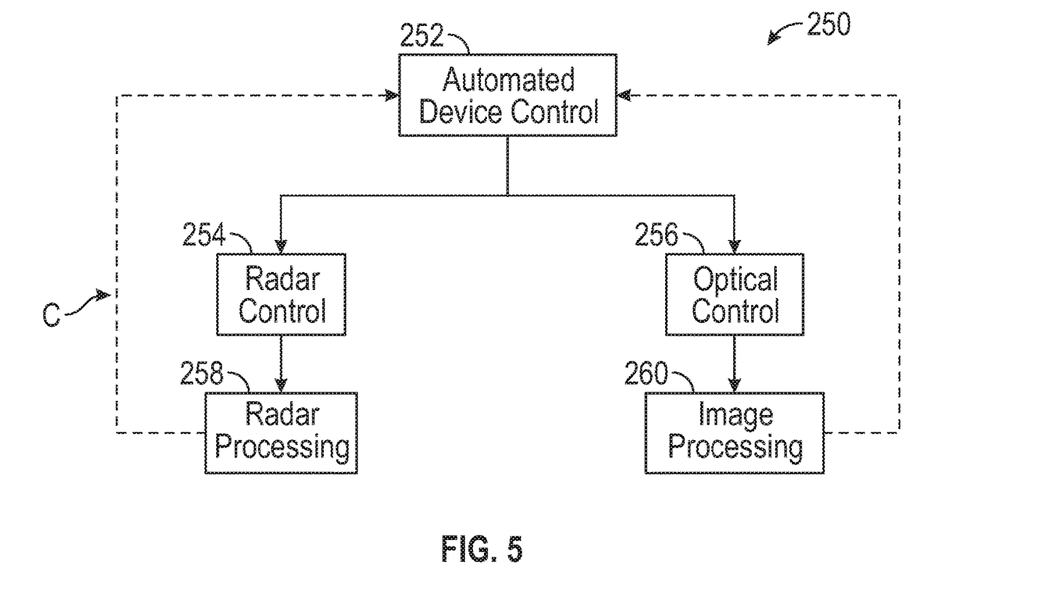
FIG. 5 is an example control structure for implementing the first method shown in FIG. 2 or the second method shown in FIG. 3.

Referring now to FIG. 5, an example control structure 250 is shown for implementing the method 100 of FIG. 2 or the method 200 of FIG. 3. The control structure 250 includes an automated device control unit 252, a radar control unit 254, an optical control unit 256, a radar processing unit 258 and an image processing unit 260. The solid arrows indicate the direction of control and/or data flow while the dashed arrows show the direction of data flow. As indicated by the solid arrows, the automated device control unit 252 independently directs the radar control unit 254 and the optical control unit 256. The radar control unit 254 and the optical control unit 256 respectively transmit the raw data to the radar processing unit 258 and the image processing unit 260, which generate a respective processed output. Referring to FIG. 5, the respective processed outputs from the radar processing unit 258 and the image processing unit 260 are transmitted independently and separately (see dashed arrows) to the automated device control unit 252 and subsequently fused to obtain a fused processed output. Steering of the radar unit 18 and the optical sensor 16 is allowed in between processing cycles. The technical advantage here is reduced latency.

The system 10 (and execution of the method 100 and/or method 200) improves the functioning of the device 12 by employing a scanning radar-optical architecture to leverage the benefits of each sensing modality and provide enhanced angular resolution. The controller C of FIG. 1 may be an integral portion of, or a separate module operatively connected to, other controllers of the device 12.

The controller C includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system of controlling operation of a device in real-time, the system comprising:
   an optical sensor and a radar unit operatively connected to the device and configured to obtain an image data and a radar data, respectively;
   a controller in communication with the radar unit and the optical sensor, the controller including a processor and tangible, non-transitory memory on which instructions are recorded for a method of detecting a target;
   wherein the optical sensor has a steerable optical field of view controllable to scan respective portions of a full optical field of view and the radar unit has a steerable radar field of view controllable to scan the respective portions of a full radar field of view, the full radar field of view at least partially overlapping with the full optical field of view;
   wherein execution of the instructions by the processor causes the controller to steer a first one of the optical sensor and the radar unit to a first region of interest;
   wherein the first one of the optical sensor and the radar unit is configured to detect the target in the first region of interest and identify a second region of interest surrounding the target, the second region of interest at least partially overlapping with the first region of interest;

wherein the controller is configured to:
steer a second one of the optical sensor and the radar unit to the second region of interest;
fuse the radar data and the image data, and obtain a target location and a target velocity; and
control operation of the device based in part on at least one of the target location and the target velocity.

2. The system of claim 1, wherein:
the controller is configured to steer a first one of the optical sensor and the radar unit in response to receiving a trigger signal.

3. The system of claim 1, wherein the radar unit includes:
a transmitter producing electromagnetic waves in at least one of a radio and a microwave domain;
one or more transmitting antennas configured to transmit electromagnetic waves;
respective phase shifters operatively connected to the one or more transmitting antennas and configured to shift a respective phase of the electromagnetic waves to produce a phased-array beam; and
one or more receiver antennas, a receiver module and respective beam modifiers, the one or more receiver antennas being configured to receive the electromagnetic waves and direct them to the receiver module, via the respective beam modifiers.

4. The system of claim 1, wherein:
the controller includes at least one of a Kalman filter module and a particle filter module configured to fuse the image data and the radar data.

5. The system of claim 1, wherein fusing the image data and the radar data includes:
obtaining at least one bounding region around the target in the image data; and
matching the at least one bounding region in the image data with the target location in the radar data, via an association module in the controller.

6. The system of claim 1, wherein:
controlling operation of the device includes obtaining a time-to-contact for the device and the target based on the target location denoted by (X, Y, Z) and the target velocity denoted by ($v_x$, $v_y$, $v_z$); and
the time-to-contact (t) is determined as:

$$t=\sqrt{(X/v_x)^2+(Y/v_y)^2+(Z/v_z)^2}.$$

7. The system of claim 6, wherein:
the device includes an automatic braking module configured to decelerate the device; and
controlling operation of the device includes sending a signal to a user of the device, when the time-to-contact is less than a first predefined threshold but greater than a second predefined threshold, the first predefined threshold being greater than the second predefined threshold; and
controlling operation of the device includes activating the automatic braking module when the time-to-contact is less than the second predefined threshold.

8. The system of claim 1, wherein:
the controller includes an automated device control unit, a radar processing unit and an image processing unit;
the radar processing unit and the image processing unit are configured to produce a respective processed output from the radar data and the image data;
the respective processed output from the first one of the optical sensor and the radar unit is transmitted to the second one of the optical sensor and the radar unit; and
the respective processed output from the second one of the optical sensor and the radar unit is fused with the respective processed output from the first one of the optical sensor and the radar unit, and subsequently transmitted to the automated device control unit.

9. The system of claim 1, wherein:
the controller includes an automated device control unit, a radar processing unit and an image processing unit;
the radar processing unit and the image processing unit are configured to produce a respective processed output from the radar data and the image data;
the respective processed output from the radar processing unit and the image processing unit are transmitted independently to the automated device control unit.

10. A method of controlling operation of a device in real-time, the device having an optical sensor, a radar unit and a controller with a processor and tangible, non-transitory memory, the method comprising:
configuring the optical sensor with a steerable optical field of view controllable to scan respective portions of a full optical field of view and obtaining an image data via the optical sensor;
configuring the radar unit with a steerable radar field of view controllable to scan the respective portions of a full radar field of view and obtaining a radar data via the radar unit, the full radar field of view at least partially overlapping with the full optical field of view;
configuring the controller to steer a first one of the optical sensor and the radar unit to a first region of interest;
detecting a target in the first region of interest, via the first one of the optical sensor and the radar unit;
identifying a second region of interest surrounding the target, the second region of interest at least partially overlapping with the first region of interest;
steering a second one of the optical sensor and the radar unit to the second region of interest, via the controller;
fusing the radar data and the image data to obtain a target location and a target velocity; and
controlling operation of the device based at least partially on at least one of the target location and the target velocity.

11. The method of claim 10, further comprising:
configuring the controller to steer the first one of the optical sensor and the radar unit in response to receiving a trigger signal.

12. The method of claim 10, wherein fusing the image data and the radar data includes:
obtaining at least one bounding region around the target in the image data; and
matching the at least one bounding region in the image data with the target location in the radar data, via an association module in the controller.

13. The method of claim 10, wherein:
controlling operation of the device includes obtaining a time-to-contact for the device and the target based on the target location denoted by (X, Y, Z) and the target velocity denoted by ($v_x$, $v_y$, $v_z$); and
determining the time-to-contact (t) as:

$$t=\sqrt{(X/v_x)^2+(Y/v_y)^2+(Z/v_z)^2}.$$

14. The method of claim 10, wherein the controller includes an automated device control unit, a radar processing unit and an image processing unit, the method further comprising:

configuring the radar processing unit and the image processing unit to produce a respective processed output from the radar data and the image data;

transmitting the respective processed output from the first one of the optical sensor and the radar unit to the second one of the optical sensor and the radar unit;

fusing the respective processed output from the first one of the optical sensor and the radar unit and the second one of the optical sensor and the radar unit to obtain a fused processed output; and transmitting the fused processed output to the automated device control unit.

15. The method of claim 10, wherein the controller includes an automated device control unit, a radar processing unit and an image processing unit, the method further comprising:

configuring the radar processing unit and the image processing unit to produce a respective processed output from the radar data and the image data; and transmitting the respective processed output independently to the automated device control unit.

16. A system of controlling operation of a device in real-time, the system comprising:

an optical sensor and a radar unit operatively connected to the device and configured to obtain an image data and a radar data, respectively;

a controller in communication with the radar unit and the optical sensor, the controller including a processor and tangible, non-transitory memory on which instructions are recorded for a method of detecting a target;

wherein the optical sensor has a steerable optical field of view controllable to scan respective portions of a full optical field of view and the radar unit has a steerable radar field of view controllable to scan the respective portions of a full radar field of view, the full radar field of view at least partially overlapping with the full optical field of view;

wherein execution of the instructions by the processor causes the controller to steer both the optical sensor and the radar unit to a region of interest;

wherein the controller is configured to:
combine the radar data and the image data from the region of interest to obtain a joined data;
detect the target in the joined data and obtain a target location and a target velocity; and
control operation of the device based in part on at least one of the target location and the target velocity.

17. The system of claim 16, wherein:
the controller includes an automated device control unit, a radar processing unit and an image processing unit;
the radar processing unit and the image processing unit are configured to produce a respective processed output from the radar data and the image data;
the respective processed output from a first one of the optical sensor and the radar unit is transmitted to a second one of the optical sensor and the radar unit; and
the respective processed output from the second one of the optical sensor and the radar unit is fused with the respective processed output from the first one of the optical sensor and the radar unit, and subsequently transmitted to the automated device control unit.

18. The system of claim 16, wherein:
the controller includes an automated device control unit, a radar processing unit and an image processing unit;
the radar processing unit and the image processing unit are configured to produce a respective processed output from the radar data and the image data; and
the respective processed output from the radar processing unit and the image processing unit are transmitted independently to the automated device control unit.

19. The system of claim 16, wherein controlling operation of the device includes:
obtaining a time-to-contact for the device and the target based in part on the target location and target velocity;
sending a signal to a user of the device, if the time-to-contact is less than a first predefined threshold but greater than a second predefined threshold; and
wherein the first predefined threshold is greater than the second predefined threshold.

* * * * *